May 3, 1938.　　　F. M. TOMLINSON　　　2,116,180
SPEED VARYING GEARING
Filed April 30, 1936　　　2 Sheets-Sheet 1

INVENTOR.
Fay. M. Tomlinson,
BY
Hood & Hahn.
ATTORNEYS.

May 3, 1938.  F. M. TOMLINSON  2,116,180
SPEED VARYING GEARING
Filed April 30, 1936  2 Sheets-Sheet 2

INVENTOR.
Fay. M. Tomlinson.
BY
Hood + Hahn.
ATTORNEYS.

Patented May 3, 1938

2,116,180

UNITED STATES PATENT OFFICE 2,116,180

SPEED VARYING GEARING

Fay M. Tomlinson, Cleveland, Ohio, assignor to Arthur M. Hood, as Trustee

Application April 30, 1936, Serial No. 77,098

17 Claims. (Cl. 74—285)

The object of my invention is to provide a compact efficient transmission gearing of such character that the speed of the power output shaft may be incrementally varied and the direction of rotation reversed.

Figure 1:
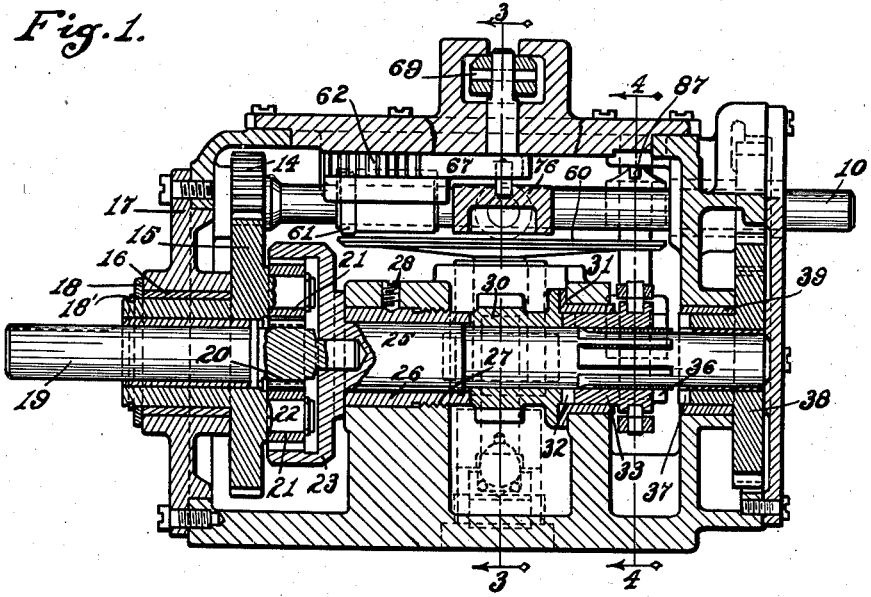
Figure 3:
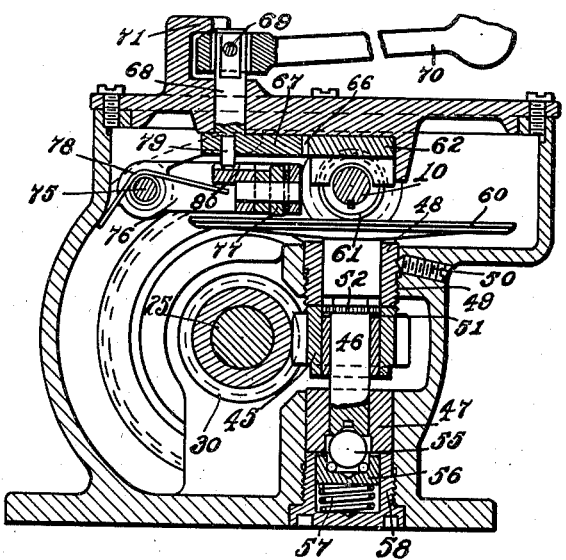
Figure 2:
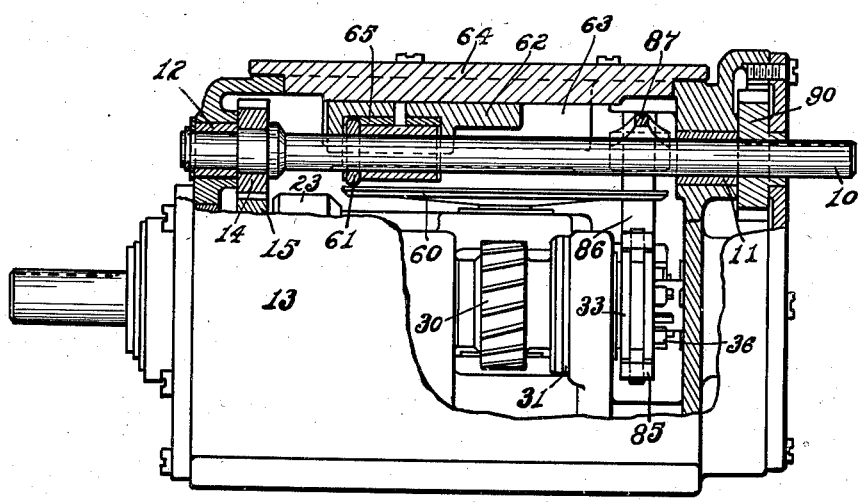

The accompanying drawings illustrate my invention, in which:

Fig. 1 is an axial section through the axis of the output shaft of an embodiment of my invention;

Fig. 2 an elevation, in fragmentary section, through the axis of the input shaft;

Fig. 3 a transverse section on line 3, 3 of Fig. 1; and

Figure 4:
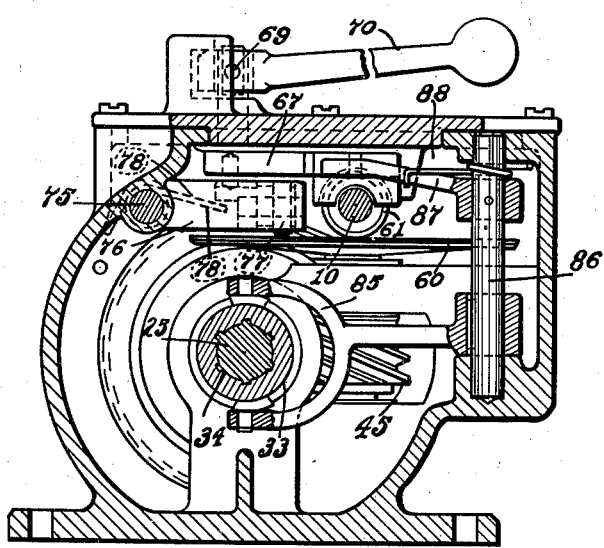

Fig. 4 a transverse section on line 4, 4 of Fig. 1.

In the drawings, 10 indicates the input shaft supported in suitable bearings 11, 12 in casing 13 and provided with a pinion 14 which meshes with a gear 15 journalled in bearings 16 in plate 17 which forms part of casing 13. Gear 15 is held axially in place by thrust washer 18 and snap ring 18'.

The gear 15 is the planet-gear carrier of a planetary transmission gearing of any well-known form and is axially bored to receive the output shaft 19 provided at its inner end with the sun gear 20 with which mesh the planet gears 21 which are journalled on planet pins 22, carried by 15, and mesh with the internal cosmos-gear 23.

Rigidly associated (conveniently integral) with the cosmos gear 23 is a shaft 25, axially aligned with shaft 19, and journalled in a bearing bushing 26 conveniently threaded in casing 13, as indicated at 27, and held in axial adjustment by temper screw 28.

Journalled upon shaft 25 is a helical or worm gear 30 axially confined between the inner end of bushing 26 and one end of bearing bushing 31. The extended hub of gear 30 is provided with a series of clutch teeth 32 adapted to be engaged by mating teeth carried by one end of an axially shiftable clutch element 33 which is splined, at 34 upon the reduced end of shaft 25 and at its other end is provided with clutch teeth 36 adapted to be meshed with clutch teeth 37 carried by the hub of the reversing gear 38 journalled in bearings 39 in the casing, the arrangement being such that the clutch element 33 may occupy a neutral position or, alternatively, positions in mesh respectively with gear 30 and gear 38.

Meshing with gear 30 is a helical or worm gear 45 which is axially slidable upon a shaft 46, the axis of which is at right angles to the axes of the input and output shafts. Shaft 46 is journalled in bearing bushings 47 and 48, bushing 48 being conveniently threaded at 49, in the casing, to provide for axial adjustment, and held in adjusted position by temper screw 50.

Gear 45 has a limited axial play between the ends of bushings 47 and 48 and is provided with clutch teeth 51 adapted to mesh with companion clutch teeth 52 on shaft 46 when the gear 45 is in its upper position.

Shaft 46 is supported upon a thrust ball 55 journalled in a cup 56 which is supported by a spring 57, cup 56 and spring 57 being conveniently housed in a cup 58 which is threaded into the casing 13 and the upper end of which forms a support for the bushing 47.

Shaft 46 at its upper end carries a friction disc 60, the flat and highly polished upper face of which is normal to a radius of the driving shaft 10 and is frictionally engaged by the friction wheel 61 which is splined upon shaft 10 and shiftable axially thereon by yoke 62 slidably mounted in ways 63 on plate 64 which forms part of casing 13. A half bearing bushing 65 is interposed between yoke 62 and the extended hub of friction wheel 61.

Yoke 62 is provided with rack teeth 66 engaged by the teeth of a segmental gear 67 carried by the control shaft 68 journalled and axially slidable in plate 64, as more clearly shown in Fig. 3. Hinged to the upper end of shaft 68 at 69, is a control lever 70, the hub of which underlies an arcuate finger 71 carried by cover plate 64, the arrangement being such that, upon depression of the outer end of lever 70, shaft 68 may be axially shifted downwardly.

Hinged upon a stud shaft 75 is an arm 76 upon which is journalled the friction wheel 77 on an axis conveniently at right angles to the axis of input shaft 10 and engageable with the upper surface of disc 60 preferably as close to the axis of said disc as is structurally possible.

Arm 76 is yieldingly urged upwardly, to free the periphery of friction wheel 77 from normal contact with disc 60, by a spring 78, and this arm is laterally braced and vertically limited by a pin 79 carried by and coaxial with the segmental gear 67 and projecting into a slot 80 formed in the upper face of arm 76.

The clutch element 33 is axially shiftable by means of a shifting fork 85 carried by a rock shaft 86 provided with an arm 87, the outer end of which is projected into the path of movement of yoke 62, and the clutch element 33 is normally biased to a position where said clutch element is in interlocking engagement with gear 30 by means of a spring 88.

Meshing with the reversing gear 38 is the companion reversing gear 90 which is keyed upon input shaft 10.

The operation is as follows:—

Assume the following gear ratios: gear 14, 24 teeth; gear 15, 72 teeth; gear 23, 48 teeth; gear 21, 16 teeth; gear 20, 16 teeth; gear 90, 30 teeth; and gear 38, 60 teeth; and gears 45, 30 in a 1 to 2 ratio and gear 45 capable of driving gear 30 but gear 30 preferably incapable of efficiently driving gear 45. Assume, also, that input shaft 10 is rotated clockwise at 1800 R. P. M., and that friction wheel 61 has a range, on disc 60, between the ratios 1:1 and 1:5.

1800 R. P. M. clockwise of shaft 10 will produce 600 R. P. M. counter-clockwise in gear 15 and if the cosmos gear 23 be held stationary, the train will produce 2400 R. P. M. counter-clockwise in the sun gear 20 and output shaft 19. But, in the apparatus shown, the slowest speed ratio between 60 and 61 is 5 to 1 and therefore if disc 60 be rotated at 360 R. P. M. and consequently the cosmos gear 23 be restrained counter-clockwise to 180 R. P. M., gear 15 being rotated at 600 R. P. M. counter-clockwise, the resultant effect upon shaft 19 will be 1860 R. P. M., the highest speed attainable in shaft 19 with the above specified ratios. Shifting friction wheel 61 to the right (Fig. 1) to a point where gear 23 is rotated counter-clockwise at 600 R. P. M. it will be evident that there will be no rotation of the planetary gears 21 upon their own axes and that the output shaft 19 will move at the rate of 600 R. P. M., i. e., the rate of rotation of gear 15. If friction wheels 61 be moved still further to the right to the point where disc 60 will be rotated at 1600 R. P. M. and consequently the cosmos gear 23 at 800 R. P. M. the planetary gears will have been reversed to a counter-clockwise rotation on their own axes to an extent sufficient to result in 0 R. P. M. in shaft 19. If, therefore, wheel 61 be shifted far enough to the right to bring it into a 1 to 1 relation with disc 60, so that disc 60 will be rotated at 1800 R. P. M., the cosmos gear 23 will be rotated at 900 R. P. M. counter-clockwise and shaft 19 will be rotated at −300 R. P. M., i. e., in a reverse direction.

I prefer, however, to provide the separate reversing gear which I have heretofore described, and therefore at the position where 61 is related to 60 to produce 800 R. P. M. counter-clockwise of 23 the end 62' of yoke 62 engages lever 87 to shift clutch element 33 out of clutching engagement with gear 30 and continued movement of yoke 62 to the right (Figs. 1 and 2) continues the movement of clutch element 33 into clutching engagement with clutch 37 of reversing gear 38 whereby the cosmos gear 23 is positively rotated counter-clockwise, by the gears 90 and 38 at 900 R. P. M. which thus provides for reverse rotation of shaft 19 at 300 R. P. M.

The reason for this construction is as follows: In the normal forward actuation of shaft 19 the gear train 61, 60, 45, 30 is not a power transmitting train but is a back-off train which serves to hold the cosmos gear 23 relatively more or less stationary as compared with the planetary movement of the planetary gears 21 and the manner or amount of torque, or rather negative torque, required to furnish this resistance is provided by the helical or worm gearing 45, 30, the remainder being provided by the frictional resistance between 61, 60, and this relatively small resistance may be adequately provided by the friction elements 61, 60. If, however, it were necessary to use the friction elements 61, 60 to produce a high speed counter-clockwise movement of the cosmos gear 23, in order to attain reverse rotation of shaft 19, the requisite torque to be transmitted through the friction elements 61, 60 would be beyond the capacity of transmission of those frictional elements.

In order to avoid the resistance of frictional contact between 61 and 60 during the axial shifting of the friction wheel 61 the operator presses down upon the free end of lever 70 so as to bring the heel of said lever against finger 71 thereby depressing disc 60 out of contact with wheel 61, said depressing force acting to bring wheel 77 down upon disc 60 and to shift said disc axially against the action of spring 57.

As this depression of disc 60 may be accomplished at any point in the swing of lever 70, and consequently at any position of yoke 62, the operator may, if he desires, be freed from the frictional resistance of disc 60 on wheel 61 during axial shifting of said wheel 61, as well as for establishing the reversing connection.

In case the load imposed upon shaft 19 tends to produce an overrunning of said shaft relative to the cosmos gear 23 there is a tendency toward locking between gears 30 and 45 and consequently, when disc 60 is contacting friction wheel 61, gear 45 may drop axially along shaft 46 far enough to separate the clutch elements 51, 52 so that shaft 46 is free to rotate within gear 45, but as soon as the overrunning relationship is discontinued the spiral or helical relationship between gear 30 and gear 45 serves to restore said gear to the position shown in Fig. 3 where its clutch element is intermeshed with the clutch element 52 of shaft 46.

It will be readily understood that if worm gears are used, the gear 45 should be the worm and that in case of helical gears the angles of the teeth should preferably be such as to make them non-reversing, or nearly non-reversing with gear 45 as the driver.

The throw of wheel 61 may be such as to carry it beyond the periphery of disc 60, in which case gear 30, being incapable of driving gear 45, the cosmos gear 23 will remain stationary and, with the proportions stated above, 1800 R. P. M. of shaft 10 will produce 2400 R. P. M. of shaft 19.

I claim as my invention:

1. A speed-change mechanism comprising, an input shaft; an output shaft; a planetary-gear group comprising a sun-gear, a cosmos-gear, a planet-gear interposed between sun-gear and cosmos gear, and a rotary carrier for said planet-gear; a torque-transmission connection between the input shaft and said carrier; and a torque-transmission connection between the cosmos gear and the input shaft, said last-mentioned connection comprising rotatively-interlocked elements permitting independent rotation of the output shaft at a higher speed than that imparted through said connection by the input shaft.

2. A speed-change mechanism comprising, an input shaft; an output shaft; a planetary-gear group comprising a sun-gear, a cosmos-gear, a planet-gear interposed between sun gear and cosmos gear, and a rotary carrier for said planet-gear; a torque transmission connection between the input shaft and said carrier; and a torque-transmission connection of friction type between the cosmos gear and the input shaft, said last-mentioned connection comprising rotatively-interlocked elements permitting independent rotation of the output shaft at a higher speed than that imparted through said connection by the input shaft.

3. A speed-change mechanism comprising, an input shaft; an output shaft; a planetary gear group comprising a sun-gear, a cosmos-gear, a planet-gear interposed between sun gear and cosmos gear, and a rotary carrier for said planet-gear; a torque transmission connection between the input shaft and said carrier; and a variable torque transmission connection between the cosmos gear and the input shaft, said last-mentioned connection comprising rotatively-interlocked elements permitting independent rotation of the output shaft at a higher speed than that imparted through said connection by the input shaft.

4. A speed-change mechanism comprising, an input shaft; an output shaft; a planetary-gear group comprising a sun-gear, a cosmos-gear, a planet-gear interposed between sun-gear and cosmos-gear, and a rotary carrier for said planet-gear; a torque-transmission connection between the input shaft and said carrier; and a variable torque-transmission connection of friction type between the cosmos-gear and the input shaft, said last-mentioned connection comprising rotatively-interlocked elements permitting independent rotation of the output shaft at a higher speed than that imparted through said connection by the input shaft.

5. A speed-change mechanism comprising, an input shaft; an output shaft; a planetary-gear group comprising a sun-gear, a cosmos-gear, a planet-gear interposed between sun-gear and cosmos-gear, and a rotary carrier for said planet-gear; a torque-transmission connection between the input shaft and said carrier; and a torque transmission connection between the cosmos gear and the input shaft; a second torque-transmission connection between the input shaft and cosmos gear, said second torque-transmission connection comprising rotatively-interlocked elements permitting independent rotation of the output shaft at a higher speed than that imparted through said connection by the input shaft; and means by which the two connections between the input shaft and cosmos-gear may be rendered alternately effective or ineffective.

6. A speed-change mechanism comprising, an input shaft; an output shaft; a planetary-gear group comprising a sun-gear, a cosmos-gear, a planet-gear interposed between sun gear and cosmos gear, and a rotary carrier for said planet-gear; a torque transmission connection between the input shaft and said carrier; and a torque-transmission connection of friction type between the cosmos gear and the input shaft; a second torque-transmission connection between the input shaft and cosmos gear, said second torque-transmission connection comprising rotatively-interlocked elements permitting independent rotation of the output shaft at a higher speed than that imparted through said connection by the input shaft; and means by which the two connections between the input shaft and cosmos-gear may be rendered alternately effective or ineffective.

7. A speed-change mechanism comprising, an input shaft; an output shaft; a planetary-gear group comprising a sun-gear, a cosmos-gear, and a planet-gear interposed between sun-gear and cosmos-gear, and a rotary carrier for said planet-gear; a torque-transmission connection between the input shaft and said carrier; a variable torque-transmission connection between the input shaft and cosmos-gear comprising two relatively-adjustable contactible friction elements one of which is rotatable by the input shaft; and a pair of meshing gears of the helix type one of which is rotatable with the cosmos-gear and the other of which is rotatable with the other friction element, said last mentioned gear being shiftable by coaction with its mating gear into and out of interlocked association with said other friction element.

8. A speed-change mechanism comprising, an input shaft; an output shaft; a planetary-gear group comprising a sun-gear, a cosmos-gear, and a planet-gear interposed between sun-gear and cosmos-gear, and a rotary carrier for said planet-gear; a torque-transmission connection between the input shaft and said carrier; a variable torque-transmission connection between the input shaft and cosmos-gear comprising two relatively-adjustable contactible friction elements one of which is rotatable by the input shaft, and a pair of rotatively-interlocked elements between the other friction element and the cosmos gear permitting independent rotation of the output shaft at a higher speed than that imparted through said rotatively-interlocked elements by the input shaft; a second torque-transmission connection between the input shaft and the cosmos-gear, and means by which the two connections from the input shaft to the cosmos-gear may be rendered alternately effective or ineffective.

9. A speed-change mechanism comprising, an input shaft; an output shaft; a planetary-gear group comprising a sun-gear, a cosmos-gear, and a planet-gear interposed between sun-gear and cosmos-gear, and a rotary carrier for said planet-gear; a torque-transmission connection between the input shaft and said carrier; a variable torque-transmission connection between the input shaft and cosmos-gear comprising two relatively-adjustable contactible friction elements one of which is rotatable by the input shaft; and a pair of meshing gears of the helix type one of which is rotatable with the cosmos-gear and the other of which is rotatable with the other friction element, said last mentioned gear being shiftable by coaction with its mating gear into and out of interlocked association with the said other friction element; a second torque-transmission connection between the input shaft and the cosmos-gear, and means by which the two connections from the input shaft to the cosmos gear may be rendered alternately effective or ineffective.

10. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, a one-way driving connection from the cosmos gear to said disk, and means by which the friction wheel may be shifted radially of the disk.

11. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, a one-way driving connection from the cosmos gear to said disk, and means by which the friction wheel may be shifted radially of the disk, said means including a controlling member and means between said controlling member and the friction disk by which said disk may be moved out of contact with the friction wheel against the spring bias of the disk.

12. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, gearing between the cosmos gear and friction disk permitting rotation of the cosmos gear in one direction independently of the disk, and means by which the friction wheel may be shifted radially of the disk.

13. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, gearing between the cosmos gear and friction disk permitting rotation of the cosmos gear in one direction independently of the disk, and means by which the friction wheel may be shifted radially of the disk, said means including a controlling member and means between said controlling member and the friction disk by which said disk may be moved out of contact with the friction wheel against the spring bias of the disk.

14. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, gearing between the friction disk and cosmos-gear shaft, gearing between the input shaft and cosmos-gear shaft, clutching means for selectively connecting the cosmos-gear shaft with the disk or input shaft, and means by which the friction wheel may be shifted radially of the disk.

15. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, gearing between the friction disk and cosmos-gear shaft permitting rotation of the cosmos-gear shaft in one direction independent of the disk, gearing between the input shaft and cosmos-gear shaft, clutching means for selectively connecting the cosmos-gear shaft with the disk or input shaft, and means by which the friction wheel may be shifted radially of the disk.

16. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, gearing between the friction disk and cosmos-gear shaft, gearing between the input shaft and cosmos-gear shaft, clutching means for selectively connecting the cosmos-gear shaft with the disk or input shaft, and means by which the friction wheel may be shifted radially of the disk, said means including means by which the disk may be shifted out of contact with the friction wheel and by which said clutching means may be shifted.

17. A speed-change gear mechanism comprising, an input shaft, an output shaft parallel with the input shaft, a sun gear carried by the output shaft, a cosmos-gear shaft alined with the output shaft, a cosmos gear carried by said last-mentioned shaft, a planetary gearing connecting said sun gear and cosmos gear, a carrier for said planetary gearing coaxial with the output shaft and cosmos-gear shaft, gearing connecting the input shaft and said carrier, a friction wheel splined upon the input shaft, a friction disk contacted by said friction wheel and arranged between the input shaft and cosmos-gear shaft and spring-urged axially toward the axis of the input shaft, gearing between the friction disk and cosmos-gear shaft permitting rotation of the cosmos-gear shaft in one direction independent of the disk, gearing between the input shaft and cosmos-gear shaft, clutching means for selectively connecting the cosmos-gear shaft with the disk or input shaft, and means by which the friction wheel may be shifted radially of the disk, said means including means by which the disk may be shifted out of contact with the friction wheel and by which said clutching means may be shifted.

FAY M. TOMLINSON.